April 29, 1969 W. H. SCHILLING 3,441,052
AUTOMATIC FLOW-RESPONSIVE VALVE
Filed May 10, 1967

WILLIAM H. SCHILLING
INVENTOR

BY

ATTORNEYS

United States Patent Office 3,441,052
Patented Apr. 29, 1969

3,441,052
AUTOMATIC FLOW-RESPONSIVE VALVE
William H. Schilling, 548 West Road,
La Habra, Calif. 90631
Continuation-in-part of application Ser. No. 389,850,
Aug. 17, 1964. This application May 10, 1967, Ser.
No. 637,575
Int. Cl. F16k *15/00, 17/00, 21/04*
U.S. Cl. 137—517
9 Claims

ABSTRACT OF THE DISCLOSURE

This invention relates to fluid valves and more particularly to an improved self-contained valve accessory adapted to be readily installed in existing fluid lines and automatically responsive to an increase in fluid flow beyond a predetermined rate to seat and block further flow. The flow responsive spring support for the valve is readily adjustable to a wide range of fluid pressures.

---

This application is a continuation-in-part of my application for United States Letters Patent Ser. No. 389,850 filed Aug. 17, 1964, now abandoned, entitled Automatic Flow Responsive Valve.

The present invention is particularly suitable for insertion in fluid flow lines for the purpose of cutting off the flow automatically should the line downstream from the accessory become excessive for any reason as, for example, upon failure of the line due to bursting or openline conditions for any of various reasons. Typical applications include the water lines leading to a clothes washer, dishwasher or other appliance serviced from the municipal water supply lines. It not infrequently occurs that the flexible supply hose servicing such an appliance or some fitting within the appliance fails unexpectedly and without warning. Upon such an occurrence, water under municipal water supply pressure escapes into the surrounding area presenting a serious hazard to the appliance and to the utility and adjoining rooms on the same or lower levels. Appliances of the type mentioned are oftentimes operated for prolonged periods unattended with the result that the consequences of open line flow can be rather serious and costly.

Another typical operating environment for the accessory is in air or gas pressurized gas line. Here, too, open line or line failure for any reason can result in serious damage or injury to personnel and property alike. Likewise, increased flow incident to open line conditions is utilized to activate the invention valve and close the line instantly and hold flow cut off until repairs have been effected.

There have been proposals made heretofore to provide flow responsive safety cut-off devices but these are subject to various shortcomings and disadvantages overcome by the present invention. More specifically, prior designs have been complex in design, costly to manufacture and lacking in versatility and capability of use in various operating environments and without satisfactory provision for adjusting them for use with different flow rates and different fluid pressures.

These and other shortcomings of the prior art flow responsive safety cut-off constructions are overcome by the simple, rugged, easily adjusted accessory provided by the present invention. Typically the present accessory comprises a tubular main body having coupling means at its upstream end for securing it to a supply line for pressurized fluid. Housed within this body is a valve normally held unseated by a coil spring having its upstream end adjustably supported in a helical groove formed along the interior side wall of the accessory and rotatable relative thereto vary the flow responsive characteristics and to adapt the accessory to use in lines operating at different pressure ranges. A resilient valve member is supported on the downstream end of a spring suspension member so calibrated as to hold the valve open unless the flow rate exceeds a predetermined normal rate. When this occurs the pressure drop across the valve is effective to seat the valve and hold it closed until repairs are effected or until the upstream pressure is cut off. No tools of any kind beyond those required by the coupling itself are required for its installation nor are any changes required in existing coupling fittings.

Accordingly it is a primary object of the present invention to provide a new, exceedingly simple, and inexpensive safety cut-off valve adapted to be installed in a fluid line without need for tools or modification of conventional fittings used in such lines.

Another object of the invention is the provision of a safety cut-off accessory installable quickly and easily within a fluid line by the novice without need for tools.

Another object of the invention is the provision of a simple flow-responsive valve accessory readily insertable in a fluid line and having a cut-off valve element normally held in open position until and unless flow exceeds a predetermined rate and responsive to any increase above this rate to close and remain closed until the upstream pressure is released.

Another object of the invention is the provision of an automatic flow-responsive valve which is automatically resettable by momentarily releasing the upstream pressure.

Another object of the invention is the provision of an automatic flow-responsive valve adapted to be installed in a flow line and readily adjustable to respond to a selected flow rate under selected pressure conditions.

These and other more specific objects will appear upon reading the following specification and claims and upon considering in connection therewith the attached drawing to which they relate.

Referring now to the drawing in which a preferred embodiment of the invention is illustrated.

Figure 1:
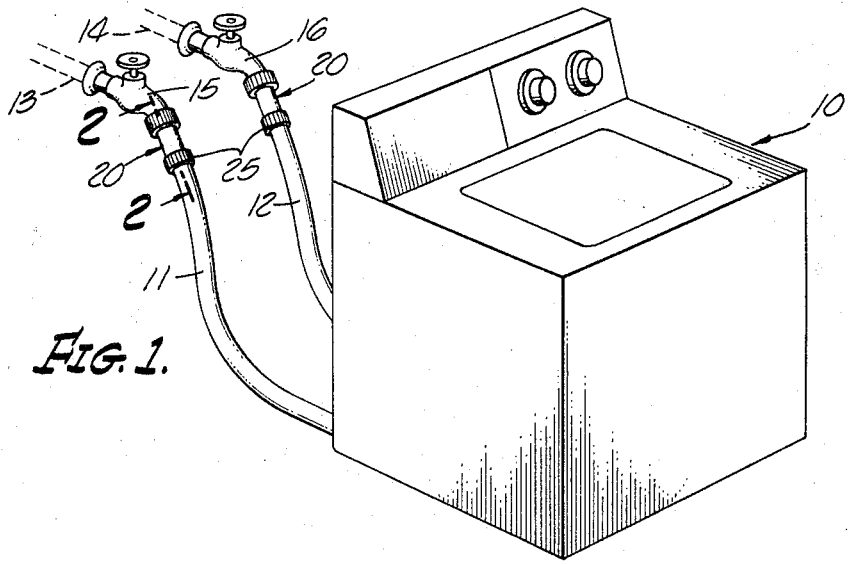
FIGURE 1 is a perspective view of the invention accessory installed in a typical operating environment.

Referring first to FIGURE 1, there is shown by way of illustration an automatic washing machine 10 having flexible hose connections 11, 12 with hot and cold water supply lines 13 and 14. Each of the latter lines is provided in customary manner with cut-off valves or spigots 15, 16 the outlet ends of which are preferably provided with conventional threads for accommodating the threaded nut of a house coupling.

Figure 2:
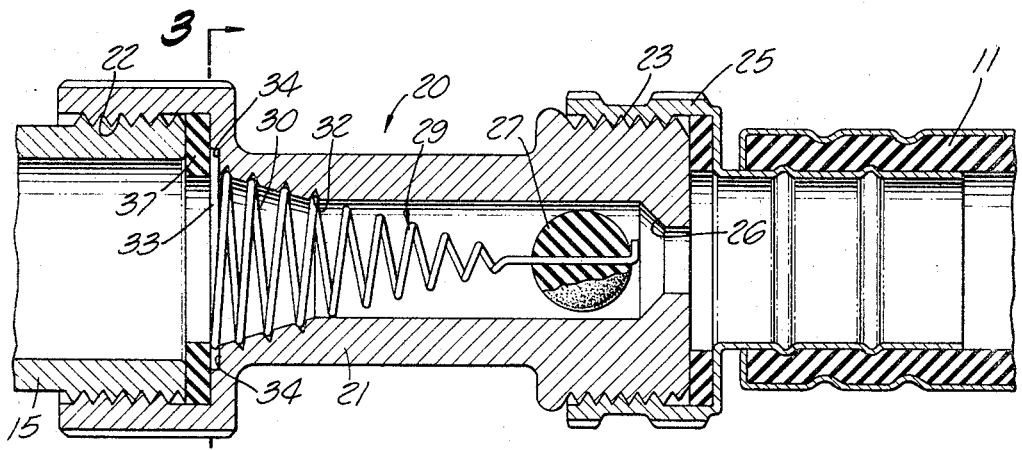
FIGURE 2 is an enlarged cross-sectional view taken along line 2—2 of FIGURE 1.
Figure 3:
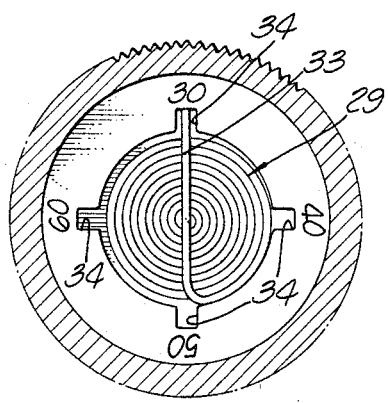
FIGURE 3 is an enlarged cross-sectional view taken along line 3—3 on FIGURE 2 and showing means for fixing the valve and spring in different selected positions.

Referring now more particularly to FIGURES 2 and 3, it is pointed out that the automatic safety cut-off accessory featured by this invention and designated generally 20 is there shown as having a main body 21 cast in one piece from metal or molded from a suitable high strength and high temperature resistant thermoplastic composition. This tubular main body 21 is formed at one end with a cup-shaped inlet end provided with female threads 22 mateable with the threads of a conventional spigot, as 15 or 16. The downstream or outlet end is formed with male threads 23 mateable with the threaded fitting 25 of hoses 11 or 12.

The flow control facility of accessory 20 includes a valve seat 26 adjacent the downstream end of the accessory. Cooperating with this seat is a normally open ball valve 27 desirably of a soft and high temperature resistant material. Valve member 27 is suitably fixed to the smaller end of a calibrated open-wound coil spring 29. This spring has its larger diameter convolutions 30 seated loosely in an inwardly opening helical groove 32 formed adjacent the interior upstream end of tubular member 21 in the manner clearly shown in FIGURE 2. These convolutions have a loose friction fit with groove 32 and it will be understood that the spring can be rotated to different positions relative to body 21 to adjust the cut-off accessory for use with different fluid pressures. In this connection it is well known that the water distribution systems of different municipalities operate at different line pressures, some water systems having a line pressure as low as 30 p.s.i. and others operating at pressures as high as 60 p.s.i., and even higher. It is important for satisfactory results that the safety cut-off device provided by this invention be adjustable to accommodate the particular pressure typically encountered in any particular locality.

This objective is attained in this invention by providing the larger convolution of spring 29 with an outturned end 33 seatable selectively in one of notches 34 distributed about the bottom of the cup-shaped portion of the upstream end of the device. For convenience each one of seats 34 has molded or otherwise formed indicia indicating the proper position for the tangs 33 of the spring under a particular system pressure condition. Desirably, tang 33 extends diametrically of the spring and provides a convenient handle or finger piece by which the spring may be gripped and rotated to the appropriate one of recesses 34. Rotation of the spring in one direction moves the valve closer to seat 26 as is desirable under lower fluid pressures whereas rotation in the opposite direction moves the valve away from the seat as is desirable for use at higher fluid pressures.

The means for holding spring 29 assembled to main body 21 preferably comprises a resilient gasket ring 37 the outer rim of which has a snug friction fit with the side wall of the upstream end of the tubular body as is clearly shown in FIGURE 2. Once spring 29 is properly seated in a desired one of recesses 34, gasket 37 is pressed into seated position against the bottom of the cup-shaped inlet end of the main body where it remains firmly seated until forcibly removed. So long as it is in assembled position spring 29 is held in a firmly seated selected adjusted position.

To install the described safety cut-off device in a hose line it is merely necessary to screw device 20 onto the threads at the end of a hose line or at the outlet end of a spigot until gasket 37 is firmly and tightly pressed against the end of the supply line. Thereafter, the coupling 25 of a hose 11 is screwed onto threads 23 at the outlet end of the device. The equipment is now ready for use in the customary manner.

During normal operation the spigots can be operated in the usual manner to admit fluid to appliance 10. Such appliances are normally so made as to limit the flow to a rate substantially less than full flow of the supply pipe. Under these conditions, cut-off valve 27 moves toward seat 26 but does not seat nor materially restrict the rate of flow to the appliance. However, should a rupture occur in the line or some part of the appliance downstream from safety device 20, the flow rate immediately increases very substantially and this increased flow is effective to seat valve 27 instantly against seat 26 and cut off all further flow until the equipment has been serviced and the defect corrected. Valve 27 is opened simply by unscrewing device 20 sufficiently to vent the pressure momentarily on the upstream side of the valve thereby allowing the spring to open the valve. Thereafter device 20 is tightened and in readiness for use as formerly.

While the particular automatic flow-responsive valve herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An adjustable automatic flow cut-off accessory adapted to be inserted between the male and female components of a hose coupling or the like and operable to permit normal flow therepast but automatically responsive to flow at greater than a predetermined rate indicative of broken or open line conditions to cut off flow, said accessory comprising a rigid tubular member having means at the upstream end thereof for connecting the same to the outlet end of a pressurized fluid line, said tubular member having a valve seat centrally of its downstream end portion and a flow passage between said upstream and downstream ends provided with an inwardly opening helical groove, a valve member, and a pressure responsive open-wound helical coil spring having its downstream end connected to said valve member and including larger diameter convolutions at its upstream end seated in said helical groove, and said spring being rotatable about the axis of said helical groove to adjust the fluid flow rate to which said valve and coil spring are responsive to seat said valve member on said valve seat and cut off flow through said accessory.

2. A flow cut-off accessory as defined in claim 1 characterized in that said coil spring is generally conical with its larger convolutions seated in said helical groove.

3. A flow cut-off accessory as defined in claim 1 characterized in that the end portion of the larger diameter convolution is bent to project generally radially of said tubular member, and said radially bent portion of the spring being selectively seatable in any one of a plurality of recesses distributed along the interior of said tubular member adjacent the larger end of said helical spring seating groove.

4. A flow cut-off accessory as defined in claim 3 characterized in that the bent portion of said larger convolution extends diametrically across the end of said spring and serves as a finger piece for use in adjusting said spring to the different operating positions thereof.

5. A flow cut-off accessory as defined in claim 1 characterized in that said tubular member is formed in one piece from rigid material.

6. A flow cut-off accessory as defined in claim 1 characterized in that said tubular member is formed in one piece from non-metallic electrically non-conductive material.

7. A flow cut-off accessory as defined in claim 1 characterized in the provision of means including a resilient gasket ring having a snug fit within the larger end of said tubular member and effective to hold said coil spring in selected adjusted assembled position in said tubular member.

8. A flow cut-off accessory as defined in claim 1 characterized in that said tubular member is provided with female threads at its upstream end adapted to mate with the threads at the end of a spigot and with male threads at its downstream end adapted to mate with the female threads of a hose coupling.

9. A flow cut-off accessory as defined in claim 7 characterized in that said spring is generally conical and having a diameter at its larger end seating loosely in the complementally-arranged helical groove formed along the interior surface adjacent the upstream end of said tubular member.

References Cited

UNITED STATES PATENTS

| 1,005,780 | 10/1911 | Raber. | |
|---|---|---|---|
| 1,904,759 | 4/1933 | Hueber. | |
| 2,929,399 | 3/1960 | Kagowan | 137—517 XR |

WILLIAM F. O'DEA, *Primary Examiner.*

WILLIAM H. WRIGHT, *Assistant Examiner.*

U.S. Cl. X.R.

137—498; 267—1